(No Model.)
W. N. KENYON.
NUT LOCK.
No. 583,908. Patented June 8, 1897.
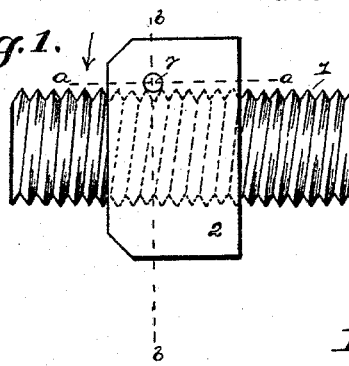
Fig. 1.
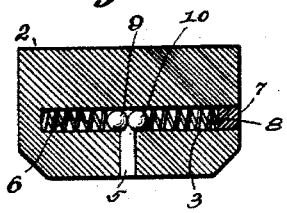
Fig. 2.
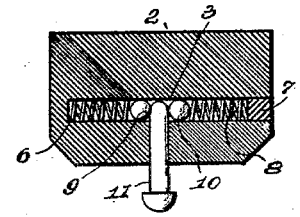
Fig. 3.
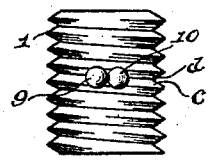
Fig. 4.
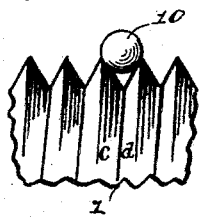
Fig. 5.
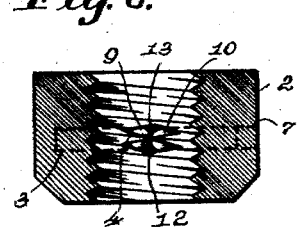
Fig. 6.
Fig. 7.
Witnesses
R. H. Newman
A. V. Abercrombie
Inventor
Wallace N. Kenyon
By Geo. D. Phillips
his Attorney

UNITED STATES PATENT OFFICE.

WALLACE N. KENYON, OF BRIDGEPORT, CONNECTICUT.

NUT-LOCK.

SPECIFICATION forming part of Letters Patent No. 583,908, dated June 8, 1897.

Application filed October 9, 1896. Serial No. 608,352. (No model.)

*To all whom it may concern:*

Be it known that I, WALLACE N. KENYON, a citizen of the United States, and a resident of Bridgeport, in the county of Fairfield and State of Connecticut, have invented certain new and useful Improvements in Nut-Locks, of which the following is a specification.

My invention relates to an improvement in nut-locks, and has for its object to securely lock a nut against rotation in either direction, so that when locked the nut will not have the slightest lateral movement to prevent a close adjustment.

The object and advantage of the invention will appear in the following description and the novel features thereof particularly pointed out in the claims to follow.

To enable others to fully understand my invention, reference is had to the accompanying drawings, in which—

Figure 1 represents a side broken elevation of a bolt with the nut mounted thereon. Fig. 2 is a sectional view of the nut through line $a$ of Fig. 1, showing the locking-balls close together as they will be when the nut is locked. Fig. 3 is a view similar to that shown at Fig. 2, except that the balls are separated by a pin or key to unlock the nut. Fig. 4 is a detail view of the threaded portion of a bolt with the balls between the threads. Fig. 5 is an enlarged detail broken side elevation of the bolt with one of the balls therein. Fig. 6 is a detail central sectional view of the nut, showing a view of the balls therein. Fig. 7 is a vertical sectional view of the nut through line $b$ of Fig. 1.

Its construction and operation are as follows:

1 represents the threaded portion of a bolt; 2, the nut.

3, Figs. 3 and 7, is a round hole or runway drilled in the side of the nut just below the top of the thread 4.

5 (see also Fig. 2) is a hole drilled at right angles to the runway 3 and in line with the center of the threaded hole therein. If preferred, the runway 3 may extend entirely through the nut and the mouth be stopped by a plug; but in the views shown the said runway is not carried entirely through. At the bottom of this runway is placed the spring 6, and against the plug 7 is placed a similar spring 8, and between these springs the two balls 9 and 10 are located. The tension of the springs is such that the normal position of the balls is directly over the axis of the nut, or, in other words, the meeting faces of such balls are in this position when brought together.

To operate the nut, the pin 11 is inserted in the hole 5 and the balls separated sufficiently to effect their disengagement from the thread of the bolt, when the nut can be run thereon to the position required. Then the pin is withdrawn, and the springs will force the balls forward into the V-shaped thread of the bolt, as shown at Fig. 4. It will be observed, Figs. 6 and 7, that the runway 3 for the balls is drilled through or nearly through one of the threads 12 of the nut, so that the aperture 13 is formed or opened into such runway. This leaves an opening for the balls to engage with the sides $c\ d$, Figs. 4 and 5, of the bolt-threads. Any attempt to turn the nut either to the right or left will force the balls toward the center or highest point of the thread and effectually check any further movement, and when necessary to change the position of the nut the pin will separate the balls, so as to disengage them from the thread of the bolt, when the nut will turn freely in either direction.

The construction as above described exhibits a feature in nut-locks of great importance where cheapness, durability, and holding facility are of primary consideration. The arrangement of the two balls to operate on each side of the center of the bolt makes it possible to obtain a very close and positive adjustment of the nut, so that when the balls are released and engage the thread the nut is, by any ordinary means, absolutely immovable. This feature alone would make a very desirable one for the close adjustment of gage-work, as the nut can be adjusted in either direction. It is not necessary to provide a special pin or key to separate the balls, as any pointed rod that will enter the pin-hole in the nut would answer the purpose.

Having thus described my invention, what I claim as new, and desire to secure by Letters Patent, is—

1. A nut-lock consisting of a hole or runway formed in the side of the nut and extending across the threads thereof, two balls placed on opposite sides of the center of the threaded portion of such nut, springs engaging such balls to force them—normally—toward such central portion, a kicking-post for each of such springs, all combined, so that when the nut is mounted on the threaded part of a bolt said balls will engage such thread and lock the nut against rotation in either direction, substantially as set forth.

2. A nut-lock consisting of a hole or runway formed in the side of the nut and extending across the threads thereof and breaking into such threads so as to open communication with the interior of such nut, two balls placed on opposite sides of the center of the threaded portion, as shown, springs engaging such balls to force them, normally, toward such central portion, a kicking-post for each of such springs, a hole formed in the face of such nut at right angles to the said runway and into the same and parallel with the axis of said nut, all combined so that, when the nut engages with a male thread, said balls will engage in the V portion of one of said male threads on opposite sides of a line parallel with the axis of such male thread and lock the nut firmly against rotation in either direction, said front hole adapted to receive a pin to separate such balls and unlock the nut, substantially as described and for the purpose set forth.

Signed at Bridgeport, in the county of Fairfield and State of Connecticut, this 6th day of October, A. D. 1896.

WALLACE N. KENYON.

Witnesses:
WILLIAM H. DOWNS,
JAMES H. BURNES.